(12) United States Patent
Moosavi

(10) Patent No.: US 8,024,811 B2
(45) Date of Patent: Sep. 20, 2011

(54) SYSTEM AND METHOD FOR SECURE PIN EXCHANGE

(75) Inventor: Vahid Moosavi, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1456 days.

(21) Appl. No.: 11/334,436

(22) Filed: Jan. 19, 2006

(65) Prior Publication Data
US 2007/0165863 A1 Jul. 19, 2007

(51) Int. Cl.
*G06F 7/04* (2006.01)
(52) U.S. Cl. ............. 726/27; 726/30; 713/193; 713/182
(58) Field of Classification Search .................. 380/277, 380/283, 259, 266; 705/71; 713/171; 726/1, 726/36
See application file for complete search history.

(56) References Cited

U.S. PATENT DOCUMENTS

| | | | |
|---|---|---|---|
| 7,023,341 B2 * | 4/2006 | Stilp | 340/572.1 |
| 7,039,391 B2 * | 5/2006 | Rezvani et al. | 455/411 |
| 7,558,529 B2 * | 7/2009 | Seshadri et al. | 455/41.2 |
| 7,587,611 B2 * | 9/2009 | Johnson et al. | 713/186 |
| 2003/0093663 A1 | 5/2003 | Walker | |

FOREIGN PATENT DOCUMENTS

| | | |
|---|---|---|
| FR | 2774120 A | 7/1999 |
| WO | WO 2004/014038 A1 | 2/2004 |
| WO | WO 2004014038 A1 * | 2/2004 |

OTHER PUBLICATIONS

European Patent Office, European Search Report, Mar. 24, 2006, EP 06010058.3.
European Examination Report. Application No. 06100558.3. Dated: Jun. 30, 2008.
Canadian First Office Action. Application No. 2,574,523. Dated: Aug. 5, 2010.
Examination Report. European Application No. 06100558.3. Dated: Oct. 25, 2010.

* cited by examiner

*Primary Examiner* — Pramila Parthasarathy
(74) *Attorney, Agent, or Firm* — Bereskin & Parr LLP/S.E.N.C.R.L.,s.r.l.

(57) ABSTRACT

A system and method for wirelessly exchanging an encryption key between a first device and a second device. The system generally includes: a transmitter, provided to the first device, for transmitting a signal that is strong enough to transmit over a predetermined distance while having a strength that decreases exponentially with distance, for example a magnetic field signal; a receiver, for example a Hall effect switch, provided to the second device, for receiving the signal; and a controller for determining when the first device and the second device are within the predetermined distance and controlling the transmitter to transmit the encryption key based on the determination.

23 Claims, 5 Drawing Sheets

SYSTEM AND METHOD FOR SECURE PIN EXCHANGE

FIELD

This application relates to a system and method for secure PIN exchange, and in particular, to a method for secure PIN exchange between a hand-held or mobile device and an accessory for the mobile device.

BACKGROUND

Over the past several years, there have been many developments in mobile devices, often leading to an individual carrying several mobile devices for different functions and also carrying several accessory devices, such as earphones, earphone/microphone combinations, keyboards, portable printers and the like, for those mobile devices. Conventionally, the various mobile devices and accessory devices have communicated with each other and also between mobile devices using wired connections. More recently, wireless connections have become available, initially by using infrared, and more recently by using Bluetooth™ or IEEE wireless standards. The Bluetooth™ standard has been specifically developed with regard to personal area networks (PAN). A personal area network is designed to allow mobile devices and accessories that are within a predetermined range of each other to form wireless connections.

Depending on the type of data exchange between a mobile device and an accessory device or between mobile devices, it can be very important to have a secure wireless connection. There are many security protocols that can be used in wireless connections, each having various features, including the length of an encryption key or key generator (both referred to as an encryption key herein), which is related to the amount of the computational power required to break the encryption. Generally speaking, greater security is provided by having a longer encryption key. In most security protocols it is necessary to first exchange the encryption key that will be used in the secure communications in a non-encrypted manner. The exchange of the encryption key thus becomes a potential weak point in the security system.

As a particular example using the Bluetooth™ security protocol, a personal identification number (PIN code) is used to generate encryption keys. The PIN code is an alpha-numeric string that can be, for example, generated by one device and then entered by a user onto another device. Conventionally, in establishing a Bluetooth™ connection, a mobile device first detects accessory devices or other mobile devices within the Bluetooth™ range, then allows a user to select one of the other devices as a connection target. The mobile device then notifies the user of a PIN code that the user enters on the accessory device to establish secure wireless communications.

The use of the PIN code (i.e. an encryption key) allows the creation of an encrypted wireless connection between devices to protect against viruses and hackers and maintain privacy. The use of the PIN code can also ensure that the mobile device will only be receiving a particular type of input from the particular accessory device to which the mobile device is intended to be connected.

The need to enter a PIN code in order to establish secure communications can be problematic because it conventionally requires that one or both of the devices to be connected have some method of displaying the PIN code and/or some form of data entry capability such as a keyboard, keypad, stylus or the like.

A further difficulty with the use of a PIN code in this manner is that, in order to achieve the appropriate level of security, the PIN code needs to have a significant number of digits, and preferably, an assortment of different types of digits so that the PIN code cannot be readily ascertained. This makes it more difficult for the user to accurately transfer the PIN code between devices. There is also the possibility that security could be compromised if the PIN code is observed while being entered on the accessory device.

As such, there is a need for an improved method of transferring/exchanging an encryption key between computing devices.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

DETAILED DESCRIPTION

Figure 1:
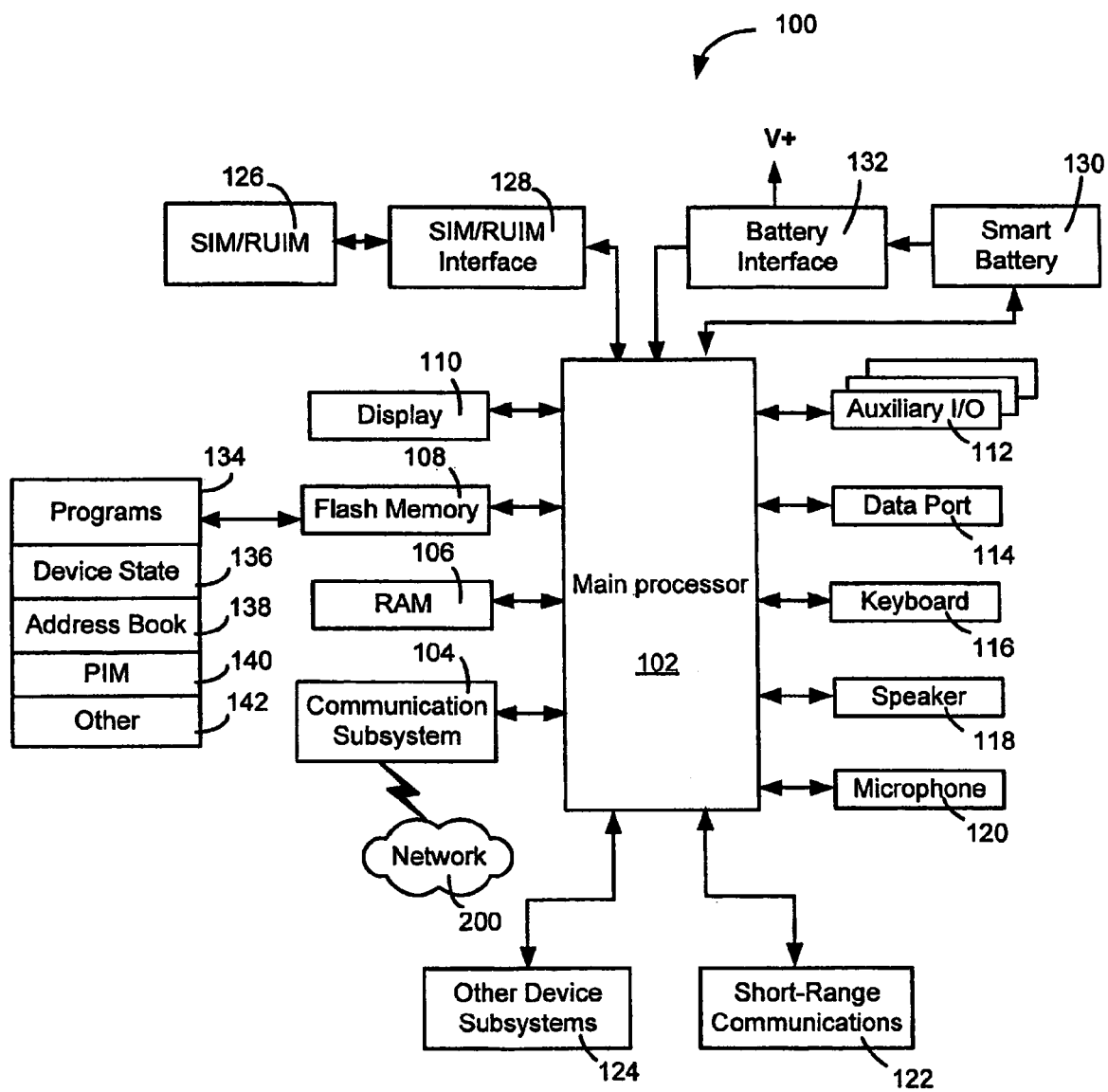
FIG. 1 is a block diagram of an exemplary embodiment of a mobile communication device.

According to an exemplary embodiment, there is provided a method for wirelessly exchanging an encryption key between a first device and a second device. The method includes: bringing the first device and the second device within a predetermined distance of each other; transmitting the encryption key from the first device using a signal that is strong enough to transmit over said predetermined distance while having a strength that decreases exponentially with distance; and receiving the encryption key at the second device.

The use of a signal that can be transmitted a predetermined distance but fall off quickly/rapidly, for example exponentially, over larger distances provides for a more secure wireless key transfer because it is difficult for third parties to intercept the wireless signal.

In a particular case, the signal may be formed by modulating a magnetic field, for example, by using frequency modulation. In another particular case, the predetermined distance may be less than approximately five centimeters, and in order to achieve better security and conserve power may be approximately two centimeters.

According to another exemplary embodiment, there is provided a system for wirelessly exchanging an encryption key between a first device and a second device. The system includes: a transmitter, provided to the first device, for transmitting a signal that is strong enough to transmit over a predetermined distance while having a strength that decreases exponentially with distance; a receiver, provided to the second device, for receiving the signal; and a controller for determining when the first device and the second device are within the predetermined distance of each other and controlling the transmitter to transmit the encryption key based on the determination.

In a particular case, the controller may determine that the first device and the second device are within the predetermined distance based on input from a user. Alternatively, the controller may make this determination using other means known to the art, including sensors or the like.

In another particular case, the predetermined distance may be less than approximately five centimeters, and in order to achieve better security and conserve power should be approximately two centimeters.

In another particular case, the signal may be a magnetic field signal. In this case, the transmitter may be an electromagnetic coil, the signal may be formed by modulating the magnetic field of the coil, and the receiver may be a Hall effect switch. In this case, the modulating may be a form of frequency modulation. The use of relatively simple, known elements such as magnets/coils and Hall effect switches provides an inexpensive, low maintenance system for key exchange.

According to another exemplary embodiment, there is provided a system for wirelessly transmitting an encryption key. In this embodiment, the system includes: a transmitter, provided to a first device, for transmitting a signal including the encryption key, wherein the signal has that is strong enough to transmit over a predetermined distance while having a strength that decreases exponentially with distance; and a controller, provided to the first device, for determining when the first device and the second device are within the predetermined distance of each other and for controlling the transmitter to transmit the encryption key signal based on the determination.

According to another exemplary embodiment, there is provided a system for wirelessly receiving an encryption key. The system includes: a receiver, provided to a second device, for receiving a signal that is strong enough to transmit over a predetermined distance while having a strength that decreases exponentially with distance; a processor, provided to the second device, for determining when the second device and a first device are within the predetermined distance of each other and controlling the receiver to receive a signal including the encryption key based on the determination.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
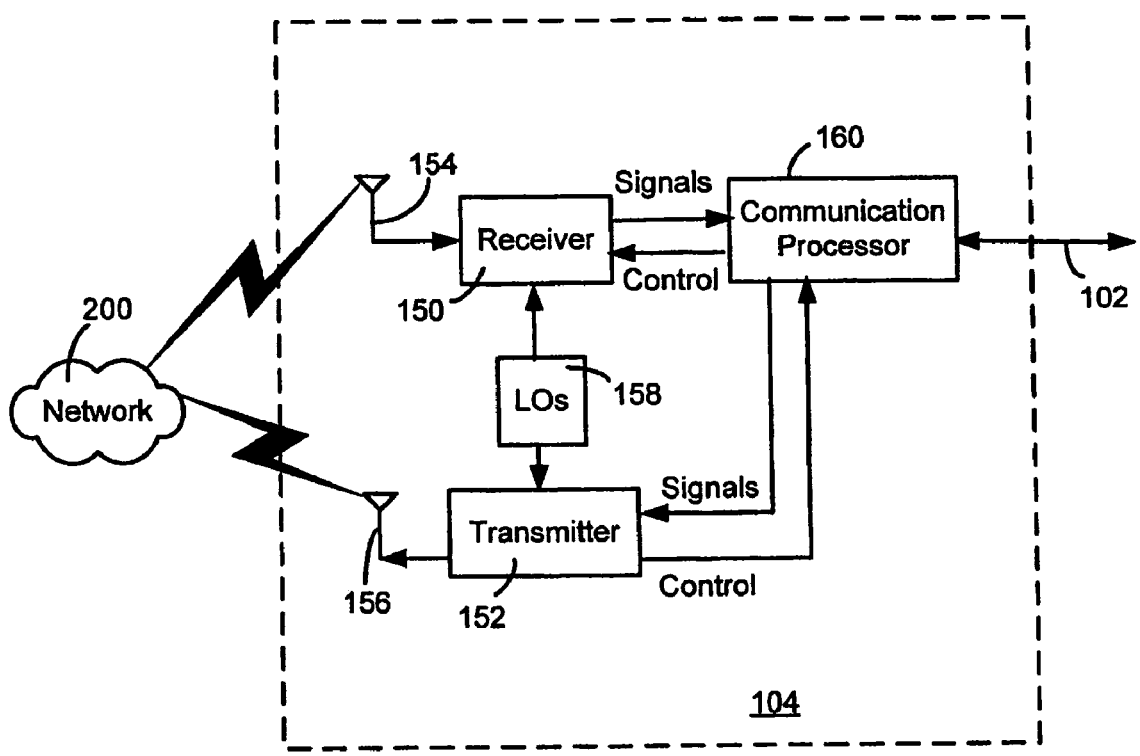
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gains applied to communication signals in the receiver 150 and transmitter 152 can be adaptively controlled through automatic gain control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
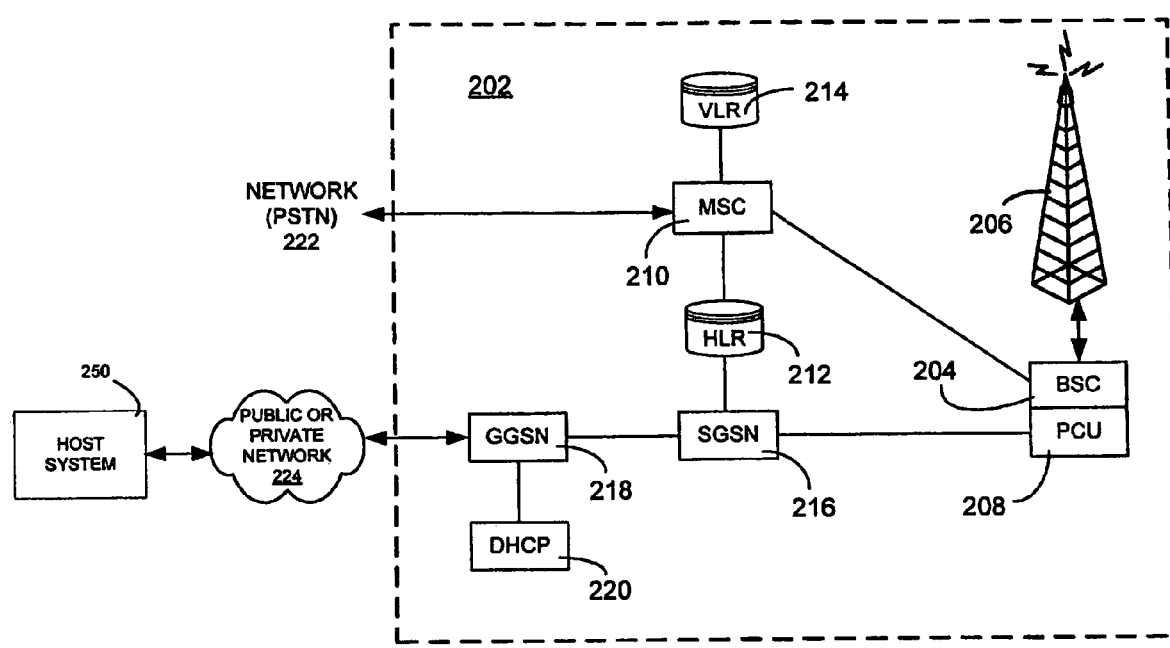

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Now that the general mobile device environment has been described, an exemplary embodiment of a system and method for the transfer/exchange of encryption keys or PINs among mobile devices and accessory devices will be described.

As described above, the mobile device 100 includes a short-range communication subsystem 122 to allow the mobile device to communicate with other devices in a predetermined area. In these short-range communications, it can be important that a secure channel be developed between the mobile device and the accessory in order to ensure privacy, protect against viruses and hackers, and the like.

Figure 4:
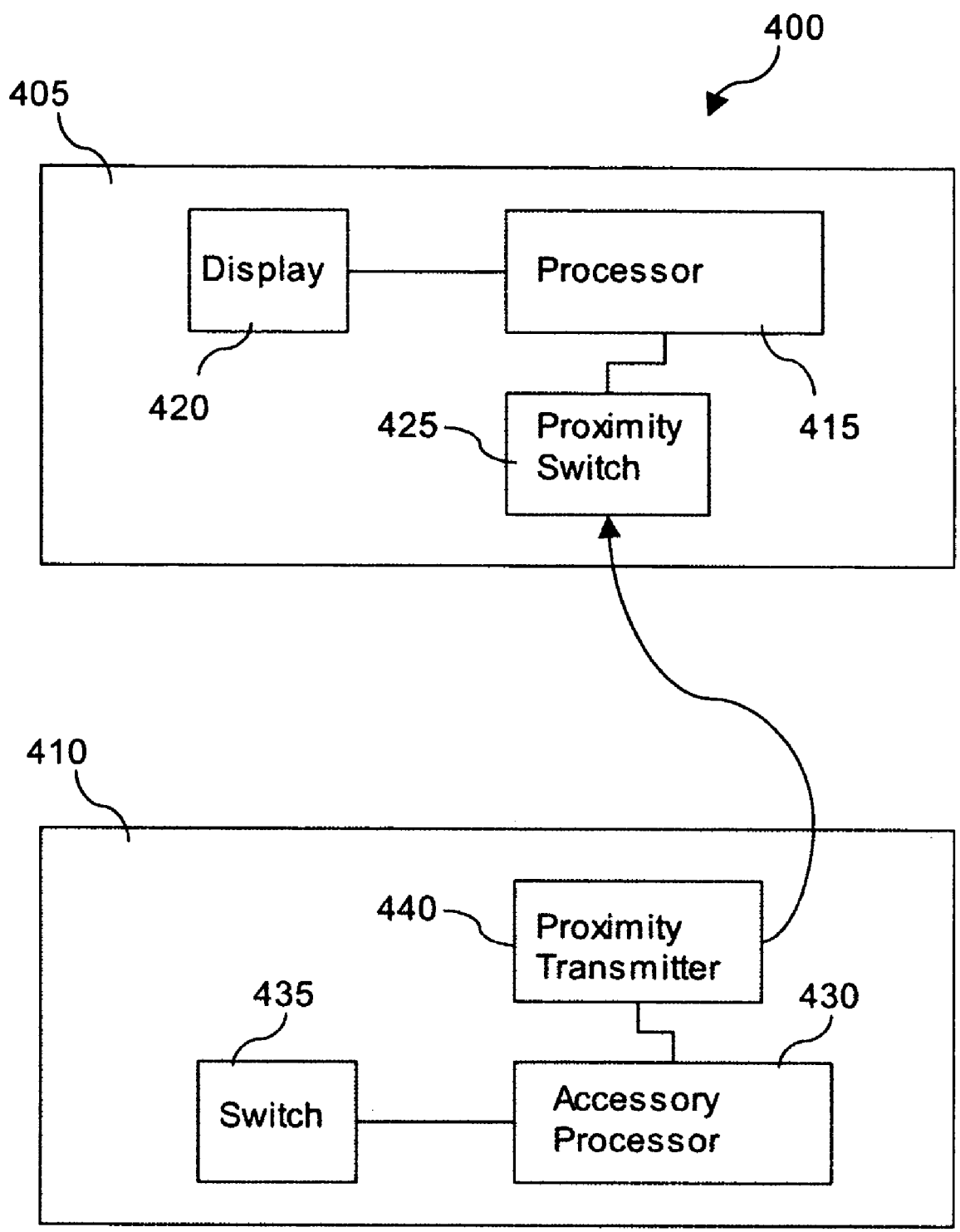
FIG. 4 is a schematic diagram showing a system for key transfer according to an embodiment of the invention.

FIG. 4 is a simplified schematic diagram illustrating a system for key transfer 400 according to an exemplary embodiment. As shown in FIG. 4, the key transfer system 400 includes a mobile device 405 and an accessory device 410. The mobile device 400 includes a processor 415, a display 420 and a proximity switch 425. The processor 415 is connected to and controls the display 420 and the proximity switch 425. In a particular case, the processor 415 may be the main processor 102 that controls the mobile device 100 of FIG. 1. Alternatively, the processor 415 may be provided in the short-range communications subsystem 122. The display 420 may be an LCD display such as those commonly found on mobile phones, personal digital assistants or the like, or may be an LED specifically provided for use in key exchange or may be some other form of display. The proximity switch 425 detects changes in a field/signal when the switch is proximate to the field/signal. In this particular example, the proximity switch 425 is a Hall effect switch that detects changes in the local magnetic field and can be calibrated to react to varying levels of magnitude of changes in the local magnetic field. In the case where the processor 415 is the main processor 102 of the mobile device 100, the proximity switch 425 may be connected to the main processor 102 as an auxiliary I/O device 112 or the like.

The accessory device 410 in FIG. 4 includes an accessory processor 430, a switch 435 and a proximity transmitter 440. The accessory processor 430 is connected to the switch 435 and the proximity transmitter 440 and controls the proximity transmitter 440. As with the mobile device 405, the accessory processor 430 may be a main processor for the accessory device 410 or may be provided for use with the proximity transmitter 440 only. The switch 435 is a data entry system that, in this embodiment, is a single button/key but could be any means of input, such as a keyboard, a numeric keypad, trackwheel, touch sensor, stylus or the like, depending on the capabilities of the accessory device 410. The proximity transmitter 440 is designed to transmit a field/signal over a short predetermined distance such that the field/signal falls off quickly/rapidly at larger distances and preferably decreases exponentially with distance. In this example, the proximity transmitter 440 is a magnetic transmitter such as a coil, a magnet or the like. The proximity transmitter 440 can be controlled by the accessory processor 430 to transmit a signal by, in the case of a coil for example, turning a magnetic field on and off at a desired frequency or in a desired sequence. Other signals/fields that decrease exponentially with distance include dipole electrostatic charge, radiation and gravity. One of skill in the art will understand that fields such as magnetic fields and dipole electrostatic fields follow an inverse cube law whereas other fields/signals, such as radiation and gravity follow an inverse square law.

In operation, when the mobile device 405 is brought into proximity of the accessory device 410 (or vice versa), the accessory processor 430 controls the proximity transmitter 440 to transmit a signal (for example, switch a magnetic field on and off) to send a PIN code to the mobile device 405 where the signal (and PIN code) is received by the proximity switch 425 (Hall effect switch). This arrangement provides a more secure system than manual entry of a PIN code because the PIN code cannot be visibly observed by a possible attacker, the PIN code is difficult to intercept or monitor remotely because the magnetic field decreases exponentially over distance, and also because the user is encouraged to change the PIN code more often simply because s/he does not need to physically type in the PIN code.

Figure 5:
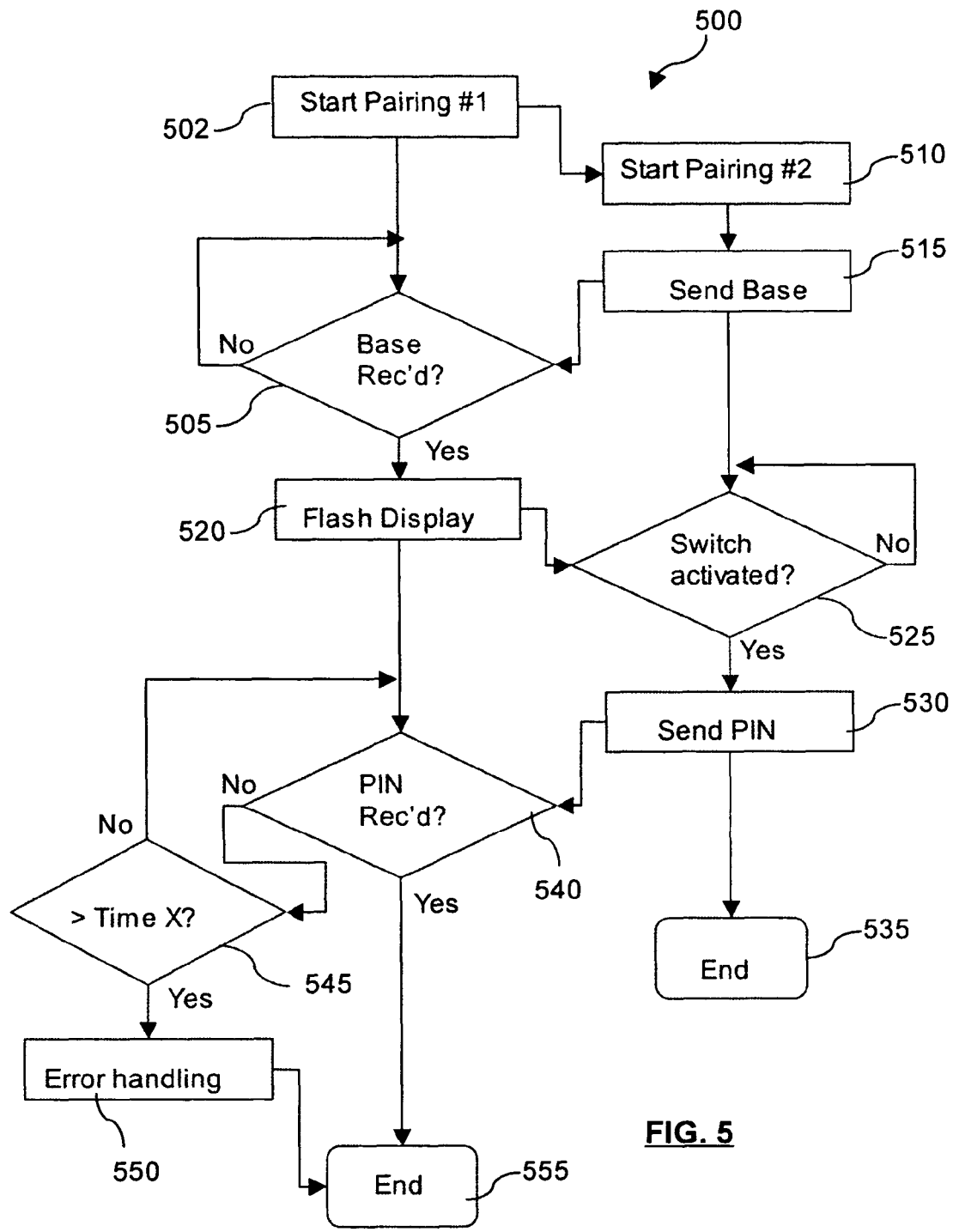
FIG. 5 is a flowchart of a method for key transfer according to an embodiment of the invention.

FIG. 5 is a flowchart which illustrates an exemplary embodiment of a method 500 of exchanging an encryption key. In this method there are two streams, one stream relating to the mobile device and another stream relating to the accessory device. FIG. 5 shows the streams and their points of interaction.

Initially, in the first stream, a user starts a pairing application on the mobile device (referred to as pairing application #1) at (502). Initially, the pairing application #1 controls the mobile device to indicate to the user that the pairing application #1 has begun, for example, by turning off an LCD backlight of the display 420. The pairing application #1 then waits for a base signal from the proximity switch at (505). Moving to the second stream, the user then starts a pairing application on the accessory device (referred to as pairing application #2) at (510). The pairing application #2 sends a base signal with the proximity transmitter, for example, pulsing a magnetic field at a predetermined frequency (e.g. at 4 Hz) and at a predetermined strength that is strong enough to activate the proximity switch on the mobile device when the mobile device and accessory are within a predetermined distance, such as 2 cm at (515). Other proximate predetermined distances may also be appropriate depending on the security requirements and magnetic transmitter strength. The user then holds the mobile device in proximity to the accessory unit. At this point, the proximity switch in the mobile device should receive the base signal and the pairing application #1 will indicate to the user that the base signal has been received by, for example, blinking the LCD backlight of the mobile device (e.g. at about once a second) at (520).

If the LCD backlight does not blink, the user may move the mobile device around in proximity to the accessory unit until the user sees the LCD backlight blink. Returning to the second stream, after sending the base signal, the pairing application #2 waits for an indication from the user that the PIN code should be sent at (525). When the user sees the LCD backlight of the mobile device flashing, the user activates the switch on the accessory device and the pairing application #2 then sends the PIN code at (530). The pairing application #2 may send the PIN code once or a predetermined number of times depending on the protocol used. After sending the PIN code, the pairing application #2 ends at (535).

Returning to the first stream, after blinking the LCD backlight at (520), the pairing application #1 waits to receive the PIN code via the proximity switch at (540). If the PIN code is not received, the pairing application #1 determines if a predetermined time has passed since flashing the LCD backlight at (545). If so, the pairing application #1 initiates error handling at (550), such as notifying the user to restart the process or the like. If the PIN code is received within the predetermined time, the pairing application #1 ends at (555).

Once the PIN code has been exchanged, the mobile device 405 and accessory device 410 can use encrypted wireless communications to protect privacy and avoid interception of the communications by unintended parties.

It will be understood by one of skill in the art that the message format for sending the PIN code can be any appropriate format and the message containing the PIN code may include headers and error checking information or the like. Similarly, the protocols for starting the pairing applications and for error handling may be altered in other embodiments. For example, although it would be a drain on batteries or the like, the accessory could be continuously broadcasting a base/carrier signal that could be detected by a mobile device and the mobile device could indicate to a user that an accessory device is in proximity for pairing.

It will be understood that the proximity transmitter and proximity receiver may be provided in either or both of the mobile device and the accessory. If both the proximity transmitter and receiver are provided in a device, it can operate as either an initiator or acceptor of the pairing process. It will be understood that while the above discussion deals with bringing the mobile device into proximity with the accessory device, it is also possible to bring the accessory device into proximity with the mobile device.

It should be understood that various modifications can be made to the exemplary embodiments described and illustrated herein, without departing from the general scope of the appended claims. It should also be understood that while the embodiments were described for a mobile device and an accessory device, the embodiments are generally applicable to communications between and among various computing and communications devices.

I claim:

1. A method for wirelessly exchanging an encryption key between a first device and a second device, the method comprising:
   detecting user input to start a pairing application at the first device;
   receiving a base signal from the second device at the first device, wherein said base signal has a strength that decreases exponentially with distance, and wherein the base signal is formed by modulating a magnetic field;
   providing an indication that the base signal has been received at the first device; and
   receiving the encryption key from the second device at the first device after a switch is user-activated at the second device in response to the indication.

2. The method of claim 1, wherein the base signal is formed by modulating the magnetic field using frequency modulation.

3. The method of claim 1, wherein the base signal is received when the first device and the second device are within a predetermined distance of each other, wherein the predetermined distance is less than approximately five centimeters.

4. The method of claim 1, wherein the first device comprises a mobile device, and wherein the second device comprises an accessory for the mobile device.

5. The method of claim 1, wherein the method further comprises: if said encryption key is not received from the second device at the first device after a predetermined time has passed after said indication is provided, initiating error handling at the first device.

6. A system for wirelessly exchanging an encryption key between a first device and a second device, the system comprising:
   a transmitter, provided to the second device, configured to transmit a base signal having a strength that decreases exponentially with distance, wherein the base signal is formed by modulating a magnetic field;
   a switch provided to the second device;
   a receiver, provided to the first device, configured to receive the base signal; and
   a processor, provided to the first device, configured to cause an indication to be provided when the base signal has been received at the first device, and wherein the transmitter is further configured to transmit the encryption key to the first device after the switch is user-activated at the second device in response to the indication.

7. The system of claim 6, wherein the processor is further configured to determine when the first device and the second device are within a predetermined distance of each other, wherein the predetermined distance is less than approximately five centimeters.

8. The system of claim 6, wherein the transmitter comprises an electro-magnetic coil, wherein the base signal is formed by modulating a magnetic field, and wherein the receiver comprises a Hall effect switch.

9. The system of claim 6, wherein the base signal is formed by modulating the magnetic field using frequency modulation.

10. The system of claim 6, wherein the first device comprises a mobile device, and wherein the second device comprises an accessory for the mobile device.

11. The system of claim 6, wherein the first device is configured to initiate error handling if said encryption key is not received from the second device at the first device after a predetermined time has passed after said indication is provided.

12. A system for wirelessly transmitting an encryption key, the system comprising:
   a transmitter configured to transmit a base signal having a strength that decreases exponentially with distance, wherein the base signal is formed by modulating a magnetic field; and
   a switch;
wherein the transmitter is further configured to transmit an encryption key after the base signal is transmitted and the switch is user activated.

13. The system of claim 12, wherein the transmitter comprises an electro-magnetic coil.

14. The system of claim 12, wherein the base signal is formed by modulating the magnetic field using frequency modulation.

15. A system for wirelessly receiving an encryption key, the system comprising:
   a receiver, provided to a first device, a signal having a strength that decreases exponentially with distance, wherein the base signal is formed by modulating a magnetic field; and
   a processor, provided to the first device, configured to cause an indication to be provided when the base signal has been received at the first device and to receive a signal comprising the encryption key from the second device after a switch is user-activated at the second device in response to the indication.

16. The system of claim 15, wherein the processor is further configured to determine when the first device and the second device are within a predetermined distance of each other, wherein the predetermined distance is less than approximately five centimeters.

17. The system of claim 15, wherein the receiver senses modulations in a local magnetic field.

18. The system of claim 17, wherein the receiver comprises a Hall effect switch.

19. The system of claim 15, wherein the first device comprises a mobile device, and wherein the second device comprises an accessory for the mobile device.

20. The system of claim 15, wherein the first device is configured to initiate error handling if said encryption key is not received from the second device at the first device after a predetermined time has passed after said indication is provided.

21. A non-transitory computer-readable storage medium comprising instructions for execution on a mobile device, wherein the instructions, when executed, perform acts of a method for wirelessly exchanging an encryption key between the mobile device and a second device, wherein the method comprises:
   detecting user input to start a pairing application at the mobile device;
   receiving a base signal from the second device at the mobile device, wherein said base signal has a strength that decreases exponentially with distance, and wherein the base signal is formed by modulating a magnetic field;
   providing an indication that the base signal has been received at the mobile device; and
   receiving the encryption key from the second device at the mobile device after a switch is user-activated at the second device in response to the indication.

22. The non-transitory computer-readable storage medium of claim 21, wherein the method further comprises receiving the base signal when the first device and the second device are within a predetermined distance of each other, wherein the predetermined distance is less than approximately five centimeters.

23. The non-transitory computer-readable storage medium of claim 21, wherein the base signal is formed by modulating the magnetic field using frequency modulation.

* * * * *